United States Patent
Zong et al.

(10) Patent No.: US 10,666,363 B2
(45) Date of Patent: May 26, 2020

(54) METHOD AND APPARATUS FOR TRANSMITTING OPTICAL SIGNAL, AND WAVELENGTH SELECTIVE SWITCH

(71) Applicant: Huawei Technologies Co., Ltd., Shenzhen, Guangdong (CN)

(72) Inventors: Liangjia Zong, Dongguan (CN); Han Zhao, Dongguan (CN); Zhiyong Feng, Dongguan (CN); Yunfei Yan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/394,699

(22) Filed: Apr. 25, 2019

(65) Prior Publication Data
US 2019/0253151 A1    Aug. 15, 2019

Related U.S. Application Data

(63) Continuation of application No. PCT/CN2016/103352, filed on Oct. 26, 2016.

(51) Int. Cl.
| | |
|---|---|
| *H04B 10/58* | (2013.01) |
| *H04J 14/02* | (2006.01) |
| *H04Q 11/00* | (2006.01) |
| *H04B 10/50* | (2013.01) |
| *H04B 10/2507* | (2013.01) |
| *H04B 10/25* | (2013.01) |

(Continued)

(52) U.S. Cl.
CPC ......... *H04B 10/58* (2013.01); *H04B 10/2507* (2013.01); *H04J 14/0212* (2013.01); *H04Q 11/0005* (2013.01); *H04B 10/25* (2013.01); *H04B 10/40* (2013.01); *H04B 10/50* (2013.01); *H04B 10/60* (2013.01); *H04J 14/02* (2013.01); *H04Q 2011/0026* (2013.01); *H04Q 2011/0049* (2013.01)

(58) Field of Classification Search
None
See application file for complete search history.

(56) References Cited

U.S. PATENT DOCUMENTS

| | | | |
|---|---|---|---|
| 7,457,547 | B2 | 11/2008 | Frisken et al. |
| 7,676,126 | B2 | 3/2010 | McLaughlin et al. |
| 8,280,206 | B2 | 10/2012 | Hu et al. |

(Continued)

FOREIGN PATENT DOCUMENTS

| | | |
|---|---|---|
| CN | 102879864 A | 1/2013 |
| CN | 104122622 A | 10/2014 |

(Continued)

*Primary Examiner* — Darren E Wolf
(74) *Attorney, Agent, or Firm* — Kilpatrick Townsend & Stockton LLP

(57) ABSTRACT

Embodiments of the present application provide a method and an apparatus for transmitting an optical signal and a wavelength selective switch. The transmission method includes: performing diffraction processing on an input optical signal, to obtain signal light and crosstalk light. The signal light is output to a target output port in a plurality of output ports. The diffraction processing includes deflecting, in a second direction, a diffraction direction of a part or all of the crosstalk light, so that the part or all of the crosstalk light is output to an area outside the output ports.

10 Claims, 13 Drawing Sheets

(51) Int. Cl.
 *H04B 10/40* (2013.01)
 *H04B 10/60* (2013.01)

(56) References Cited

U.S. PATENT DOCUMENTS

| | | |
|---|---|---|
| 9,019,612 B2 | 4/2015 | Wagener |
| 2005/0002314 A1 | 1/2005 | Hasegawa et al. |
| 2014/0016079 A1 | 1/2014 | Sakurai |
| 2014/0023316 A1* | 1/2014 | McLaughlin ........ G02B 6/3518 385/17 |
| 2014/0321796 A1 | 10/2014 | Ohtsuka et al. |

FOREIGN PATENT DOCUMENTS

| | | |
|---|---|---|
| CN | 105229512 A | 1/2016 |
| EP | 3514587 A1 | 7/2019 |
| WO | 2014153455 A1 | 9/2014 |
| WO | 2016130585 A1 | 8/2016 |

\* cited by examiner

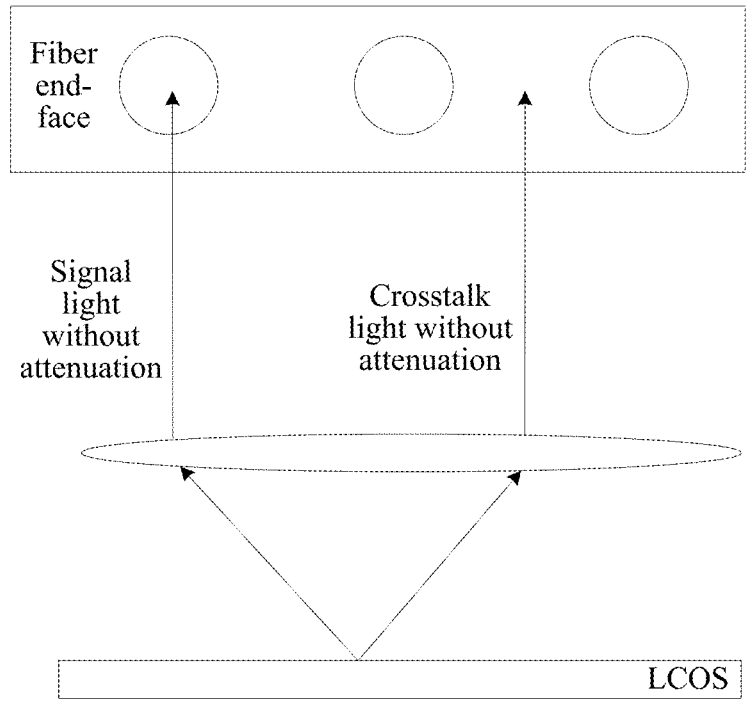
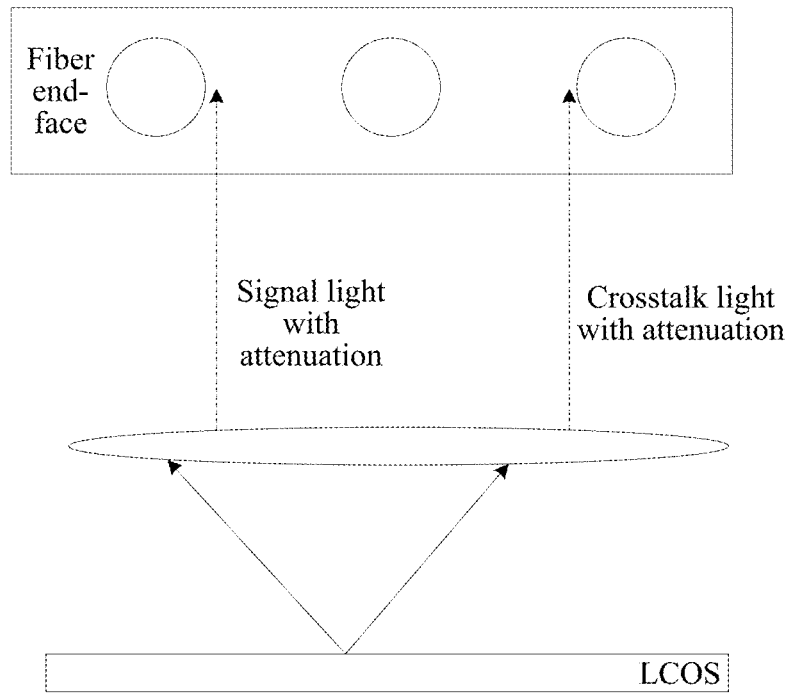
FIG. 1

Performing diffraction processing on an input optical signal obtained from an input port, to obtain signal light and crosstalk light, where the diffraction processing includes deflecting, in a second direction, a diffraction direction of a part or all of the crosstalk light ~S101

Outputting the signal light to a target output port in a plurality of output ports, and output the part or all of the crosstalk light to an area outside all the output ports ~S102

FIG. 2

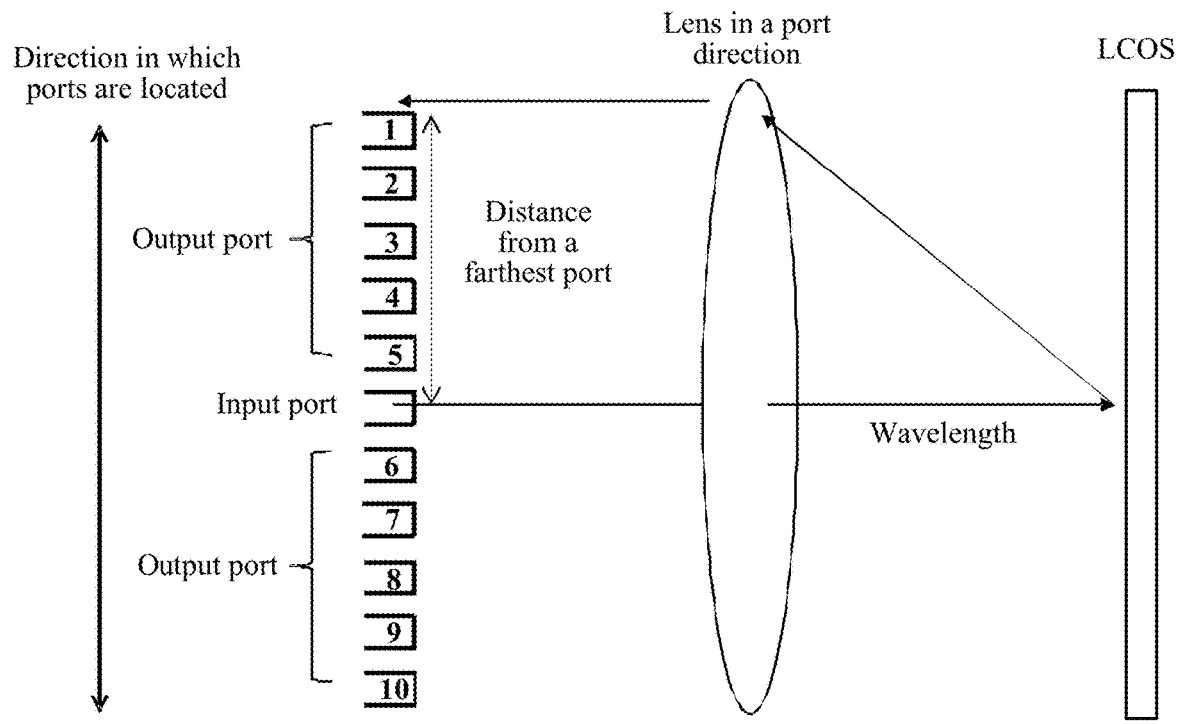

FIG. 3

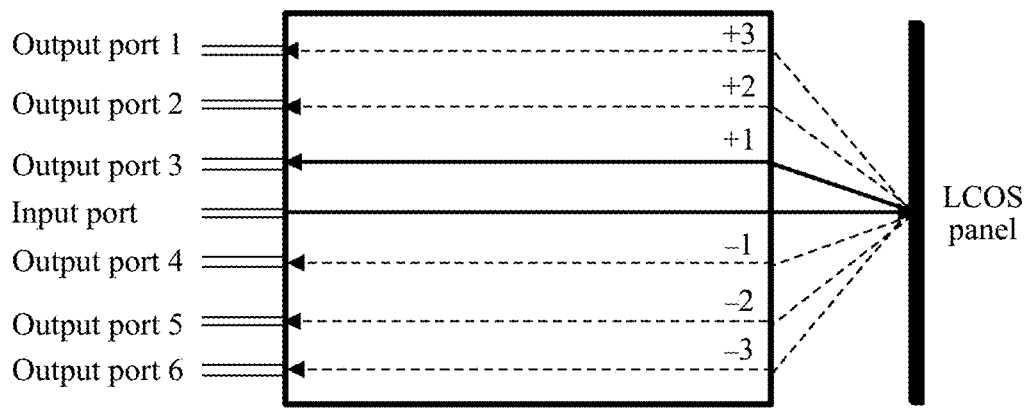

FIG. 4

Determining, based on a first direction, a first deflection angle of a diffraction direction of signal light in the first direction and a second deflection angle of crosstalk light in the first direction, where the first direction is a connection direction from an input port to a target output port; and
deflecting, in a second direction, a diffraction direction of a part or all of the crosstalk light, so that the part or all of the crosstalk light is output to an area outside all output ports, where the second direction intersects with an input direction of the input port ~ S501

FIG. 5

Determining, based on a first direction, a first deflection angle of a diffraction direction of signal light in the first direction and a second deflection angle of crosstalk light in the first direction, where the first direction is a connection direction from an input port to a target output port; and
the crosstalk light including first split crosstalk light and second split crosstalk light, deflecting in a second direction, a diffraction direction of the first split crosstalk light by a third deflection angle; and deflecting, in the second direction, a diffraction direction of the second split crosstalk light by a fourth deflection angle or skip deflecting a diffraction direction of the second split crosstalk light ~ S901

FIG. 9

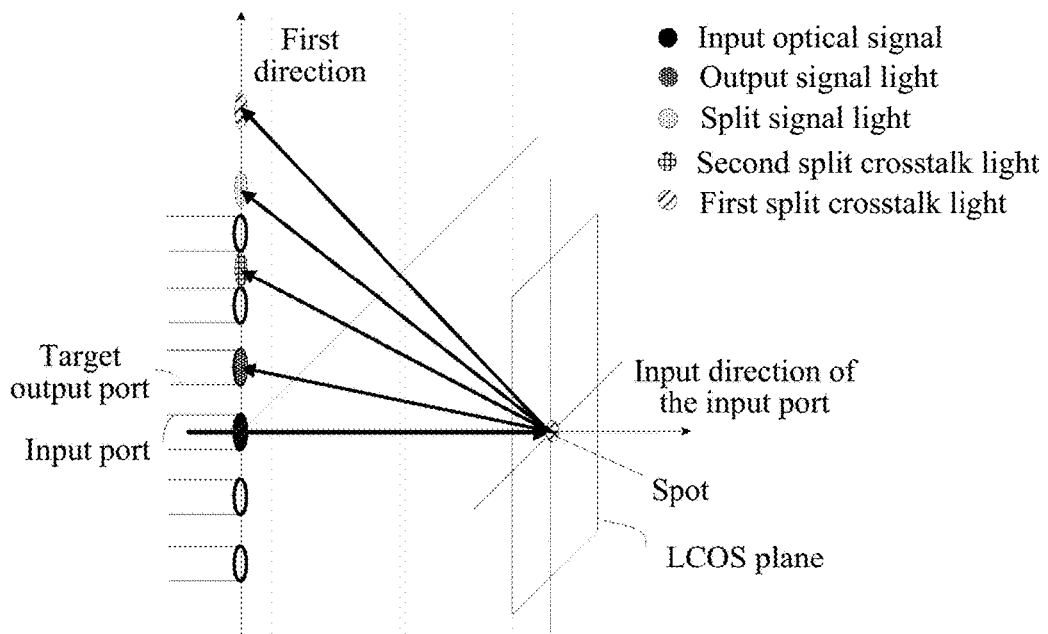

FIG. 10

Determining, based on a first direction, a first deflection angle of a diffraction direction of signal light in the first direction and a second deflection angle of crosstalk light in the first direction, where the first direction is a connection direction from an input port to a target output port; the crosstalk light including first split crosstalk light and second split crosstalk light. Deflecting, in a second direction, a diffraction direction of the first split crosstalk light by a third deflection angle; and deflecting, in the second direction, a diffraction direction of the second split crosstalk light by a fourth deflection angle or skip deflecting a diffraction direction of the second split crosstalk light; and deflecting, in a third direction, a diffraction direction of the crosstalk light ~ S1301

FIG. 13

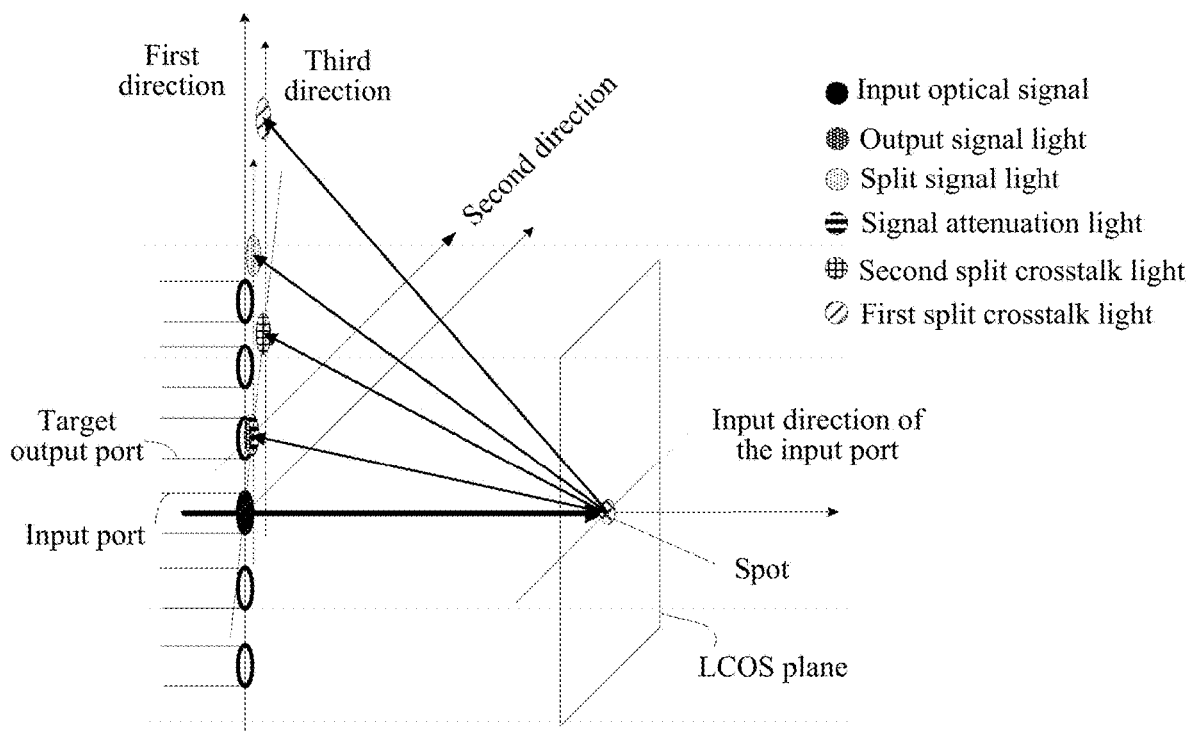

FIG. 14

METHOD AND APPARATUS FOR TRANSMITTING OPTICAL SIGNAL, AND WAVELENGTH SELECTIVE SWITCH

CROSS-REFERENCE TO RELATED APPLICATIONS

This application is a continuation of International Application No. PCT/CN2016/103352 filed on Oct. 26, 2016, which is hereby incorporated by reference in its entirety.

TECHNICAL FIELD

Embodiments of the present application relate to the field of optical communications technologies, and in particular, to a method and an apparatus for transmitting an optical signal, and a wavelength selective switch.

BACKGROUND

As users have rapidly increasing requirements for network traffic and bandwidths, operators are also increasingly urgent to implement an intelligent scheduling function of a bottom-layer wavelength division multiplexing (WDM) network in an optical communication network.

In a transmission process of an optical signal, a power of the optical signal may have a nonlinear gain or attenuation, resulting in various problems in network management. For example, an excessively high power of the optical signal may result in greater nonlinear transmission costs, and an excessively low power of the optical signal results in an excessively small signal-to-noise ratio of signal light of a receive end. Therefore, in the transmission process of the optical signal, the power of the optical signal needs to be adjusted to fall within a specified power range. For example, for an 80-channel system having 80 communication bands, in a system specification, for each transmission span, a power value of an optical signal in a channel corresponding to each band is required to be +1 decibel milliwatt dBm.

A power of a to-be-adjusted optical signal may be adjusted by adding an insertion loss to the optical signal. In a specific method, when the optical signal passes through a reconfigurable optical add-drop multiplexer (ROADM) node constructed by a wavelength selective switch (WSS) device, a diffraction direction of an input optical signal whose power needs to be adjusted is controlled by using liquid crystal on silicon (LCOS) in the WSS device, so that only a part of the optical signal is output from a target output port, and the optical signal is attenuated.

FIG. 1 is a schematic diagram of an optical path of a power adjusting method. When the signal light is deflected toward an outer edge of the target output port by an angle, crosstalk light is also deflected. In such a method, although a power of an optical signal can be attenuated, high-order diffractive light, generated after deflection processing, that is the crosstalk light, is also deflected. When the crosstalk light approaches to another output port, crosstalk energy coupled to the other output port increases. Consequently, isolation between ports decreases.

SUMMARY

Embodiments of the present application provide a method and apparatus for transmitting an optical signal, and a wavelength selective switch, to resolve a problem that crosstalk increases and that is caused by power balancing on an optical signal in the prior art.

A first aspect of the embodiments of the present application provides a method for transmitting an optical signal, including:

performing diffraction processing on an input optical signal obtained from an input port, to obtain signal light and crosstalk light, where the signal light is output to a target output port in a plurality of output ports; and the diffraction processing includes: deflecting, in a second direction, a diffraction direction of a part of the crosstalk light or a diffraction direction of all of the crosstalk light, so that the part of the crosstalk light or all of the crosstalk light is output to an area outside all the output ports, where the second direction intersects with an input direction of the input port.

With reference to the first aspect, in a first optional implementation of the first aspect, the diffraction processing further includes:

determining, based on a first direction, a first deflection angle of a diffraction direction of the signal light in the first direction and a second deflection angle of the crosstalk light in the first direction, where the first direction is a connection direction from the input port to the target output port.

With reference to the first optional implementation of the first aspect, in a second optional implementation of the first aspect, the second direction is perpendicular to the first direction or intersects with the first direction.

With reference to the second optional implementation of the first aspect, in a third optional implementation of the first aspect, a deflection angle of the signal light in the first direction and/or the second direction is further used to enable a part of the signal light to be transmitted to an area outside the target output port.

With reference to the first optional implementation of the first aspect, in a fourth optional implementation of the first aspect, the crosstalk light includes first split crosstalk light and second split crosstalk light, the deflecting, in a second direction, a diffraction direction of a part or all of the crosstalk light includes:

deflecting, in the second direction, a diffraction direction of the first split crosstalk light by a third deflection angle, and deflecting, in the second direction, a diffraction direction of the second split crosstalk light by a fourth deflection angle or skipping deflecting a diffraction direction of the second split crosstalk light.

With reference to the fourth optional implementation of the first aspect, in a fifth optional implementation of the first aspect, the second direction is the same as the first direction, and the diffraction processing further includes:

deflecting, in a third direction, the diffraction direction of the crosstalk light, where the third direction is perpendicular to the first direction.

With reference to the fifth optional implementation of the first aspect, in a sixth optional implementation of the first aspect, the signal light includes split signal light, and the diffraction processing further includes:

deflecting, in the second direction, a diffraction direction of the split signal light by a third deflection angle, and deflecting, in the second direction, a diffraction direction of a part of the signal light other than the split signal light by a fourth deflection angle, where the part of the signal light other than the split signal light includes signal attenuation light, and a deflection angle of the signal light in the first direction and/or the third direction is further used to enable the part of the signal light to be transmitted to an area outside the target output port.

With reference to any one of the fourth to the sixth optional implementations of the first aspect, in a seventh optional implementation of the first aspect, the second direction is the same as the first direction, a deflection angle of the diffraction direction of the second split crosstalk light in the first direction includes the second deflection angle and the third deflection angle, and a deflection angle of the diffraction direction of the first split crosstalk light in the first direction includes the second deflection angle and the fourth deflection angle.

With reference to the seventh optional implementation of the first aspect, in an eighth optional implementation of the first aspect, the input direction of the input port and output directions of all the output ports are parallel to each other, the input direction of the input port is opposite to the output directions of all the output ports, and the input port and all the output ports are located in a same plane; and the fourth deflection angle is zero; and the transmission method includes:

performing the diffraction processing based on a first grating diffraction equation in the first direction, where the first grating diffraction equation is used to determine, based on a first period parameter, deflection angles of the signal light and the crosstalk light in the first direction, and the first period parameter is used to enable all of the signal light to be output from the target output port when a target attenuation value of the input optical signal is zero;

performing the diffraction processing based on a second grating diffraction equation in the third direction, where the second grating diffraction equation is used to determine, based on a second period parameter, deflection angles of the signal light and the crosstalk light in the third direction; and performing the diffraction processing based on a splitting grating equation in the first direction, where the splitting grating equation is used to determine the first split crosstalk light and the second split crosstalk light, based on a split ratio, the first period parameter, and the third period parameter, the split ratio being a ratio of the first split crosstalk light to the second split crosstalk light, wherein when the target attenuation value is not zero, the split ratio and the third period parameter are used to enable a sum of powers of the crosstalk light and the split signal light to be equal to the target attenuation value.

With reference to the eighth optional implementation of the first aspect, in a ninth optional implementation of the first aspect, the second period parameter ∈ (a target period, 255), and the target period is a minimum value of the second period when a difference between the power of the input optical signal and the power of the signal light is equal to the target attenuation value.

With reference to the eighth or ninth optional implementation of the first aspect, in a tenth optional implementation of the first aspect, the split ratio and the second period parameter are used to enable crosstalk values corresponding to all the output ports to be minimized.

A second aspect of the present application provides an apparatus for transmitting an optical signal, configured to perform the method for transmitting an optical signal according to any of the first aspect.

A third aspect of the present application provides a wavelength selective switch, including: an input port, a plurality of output ports, and liquid crystal on silicon, where the liquid crystal on silicon is configured to perform the method for transmitting an optical signal according to any of the first aspect.

With reference to the third aspect, in a first optional implementation of the third aspect, the wavelength selective switch further includes a lens, where the input port and the output ports are located on one side of the lens, and the liquid crystal on silicon is located on the other side of the lens.

According to the method for transmitting an optical signal in the embodiments of the present application, the diffraction processing is performed on the input optical signal obtained from the input port, to obtain the signal light and the crosstalk light. The signal light is output to the target output port in the plurality of output ports. The diffraction processing includes: deflecting, in the second direction, the diffraction direction of the part or all of the crosstalk light, so that the part or all of the crosstalk light is output to the area outside all the output ports. The second direction intersects with the input direction of the input port. In the embodiments of the present application, a crosstalk value of the optical signal during power balancing can be reduced.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show some embodiments of the present application, and persons of ordinary skill in the art may derive other drawings from these accompanying drawings without creative efforts.

FIG. 1 is a schematic diagram of an optical path of a power adjusting method;

FIG. 2 is a flowchart of Embodiment 1 of a method for transmitting an optical signal according to the present application;

FIG. 3 is a schematic structural diagram of a WSS;

FIG. 4 is a schematic diagram of a high order diffractive optical path;

FIG. 5 is a flowchart of Embodiment 2 of a method for transmitting an optical signal according to the present application;

FIG. 9 is a flowchart of Embodiment 3 of a method for transmitting an optical signal according to the present application;

FIG. 10 is a schematic diagram of first optical path deflection corresponding to diffraction processing in the method shown in FIG. 9;

FIG. 13 is a flowchart of Embodiment 4 of a method for transmitting an optical signal according to the present application;

FIG. 14 is a schematic diagram of first optical path deflection corresponding to diffraction processing in the method shown in FIG. 13;

DETAILED DESCRIPTION

Figure 6:
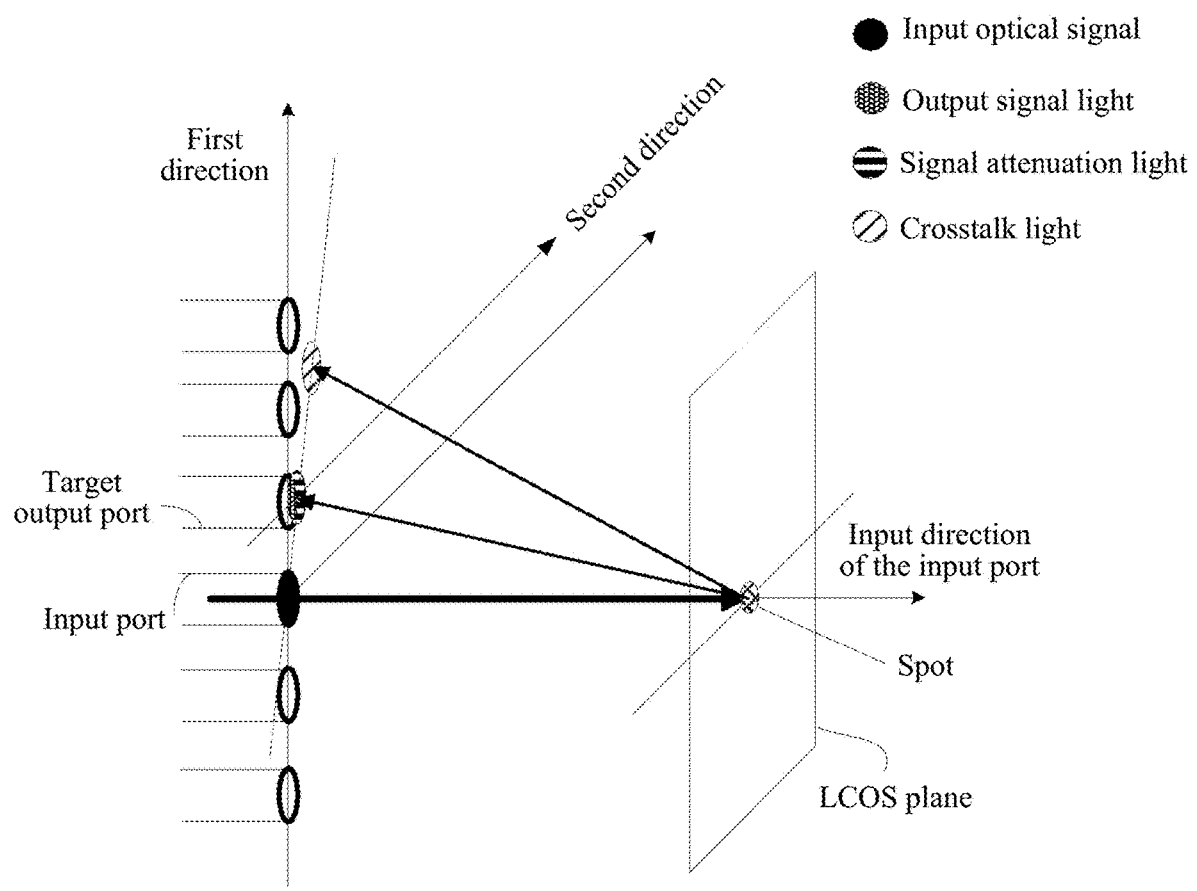
FIG. 6 is a schematic diagram of first optical path deflection corresponding to diffraction processing in the method shown in FIG. 5.

To make the objectives, technical solutions, and advantages of the embodiments of the present application clearer, the following clearly and completely describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

In an optical fiber communications system, a wavelength selective switch WSS device is usually configured to implement optical path switching. Because multiple channels of optical signals have different attenuations during transmission in the optical fiber communications system, power balancing needs to be performed on the multiple channels of optical signals in an optical path. In an implementation of the power balancing, an attenuation is inserted to an optical signal having a relatively high power when the WSS performs optical path switching. The embodiments of the present application provide a method for transmitting an optical signal, to implement power balancing during optical path switching.

Embodiment 1

FIG. 2 is a flowchart of Embodiment 1 of a method for transmitting an optical signal according to the present application; FIG. 3 is a schematic diagram of an optical path of signal light in the method shown in FIG. 2; and FIG. 4 is a schematic diagram of a diffractive optical path.

A perform entity in this embodiment may be used in a WSS. Referring to FIG. 3, the WSS may include an input port, a plurality of output ports, and liquid crystal on silicon (LCOS). Optionally, the WSS may further include a lens. The input port and the plurality of output ports may be located on one side of the lens, and the LCOS may be located on the other side of the lens.

This embodiment of the present application includes the following steps.

S101: Performing diffraction processing on an input optical signal obtained from the input port, to obtain signal light and crosstalk light, where the diffraction processing includes deflecting, in a second direction, a diffraction direction of a part or all of the crosstalk light.

S102: Outputting the signal light to a target output port in the plurality of output ports, and output the part or all of the crosstalk light to an area outside all the output ports.

The second direction may be perpendicular to an input direction of the input port or intersect with the input direction of the input port.

In this embodiment of the present application, to implement optical path switching, the diffraction processing in S101 may usually include:

determining, based on a first direction, a first deflection angle of a diffraction direction of the signal light in the first direction and a second deflection angle of the crosstalk light in the first direction, where the first direction is a connection direction from the input port to the target output port.

It should be noted that referring to FIG. 4, when the diffraction processing is performed on the input optical signal, low order diffractive light and multiple channels of high-order diffractive light are usually generated. +1 order diffractive light is low order diffractive light used to output the signal light. +2 order diffractive light, −1 order diffractive light, −2 order diffractive light, and the like are high-order diffractive light. To be specific, the crosstalk light may have multiple channels of diffractive light, and each channel of diffractive light has a different diffraction angle in the first direction. The diffraction angle refers to an emergent angle at which each channel of diffractive light leaves the LCOS after the diffraction processing.

For example, after the input port receives the input optical signal, the input optical signal does not change an optical transmission path of the input optical signal when passing through the lens. A phase grating is loaded to the LCOS to implement the diffraction processing. When the input optical signal forms a spot after input into the LCOS, the LCOS performs diffraction processing on light on each pixel on the spot, to deflect a diffraction direction of each channel of diffractive light of the input optical signal. The diffraction direction of the signal light should correspond to a location of the target output port, so that all or a part of optical signals in the signal light may be output from the target output port, to switch the optical path.

Meanwhile, the diffraction processing further includes deflecting a diffraction direction of a part or all of the crosstalk light. The part or all of the crosstalk light is not output from the target output port, and a part or all of a power of the crosstalk light is lost. Therefore, by removing the part or all of the power of the crosstalk light from the input optical signal, a power attenuation may be caused, so that an insertion loss for the channel of optical signal is implemented. In addition, the part or all of the crosstalk light is output from the area outside all the output ports. Therefore, in this embodiment of the present application, a crosstalk value of each output port can be reduced while power balancing is implemented.

It should be further noted that in the embodiments of the present application, the first direction, the second direction, and a third direction all start from the input port, and a deflection angle of each channel of diffractive light of the input optical signal in the first direction means that an emergent direction of the diffractive light of the input optical signal is deflected in a plane determined by the input direction of the input port and the first direction.

Various implementations of the embodiments of the present application are described with reference to specific schematic diagrams of diffractive optical paths.

Embodiment 2

Figure 7:
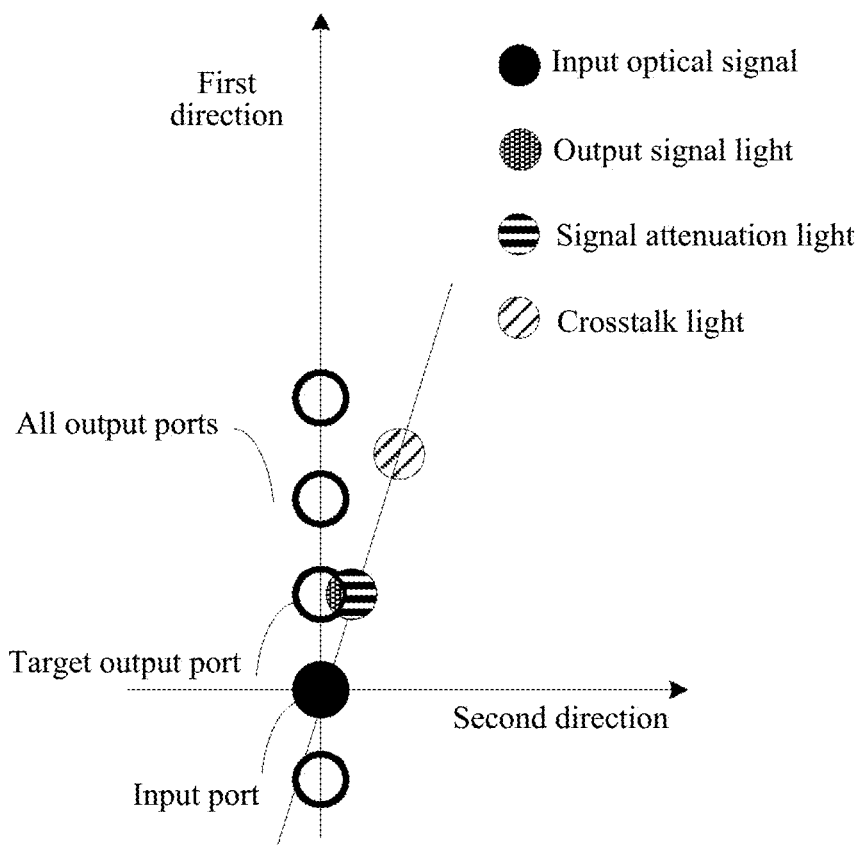
FIG. 7 is a side view of the first optical path deflection corresponding to diffraction processing shown in FIG. 6.
Figure 8:
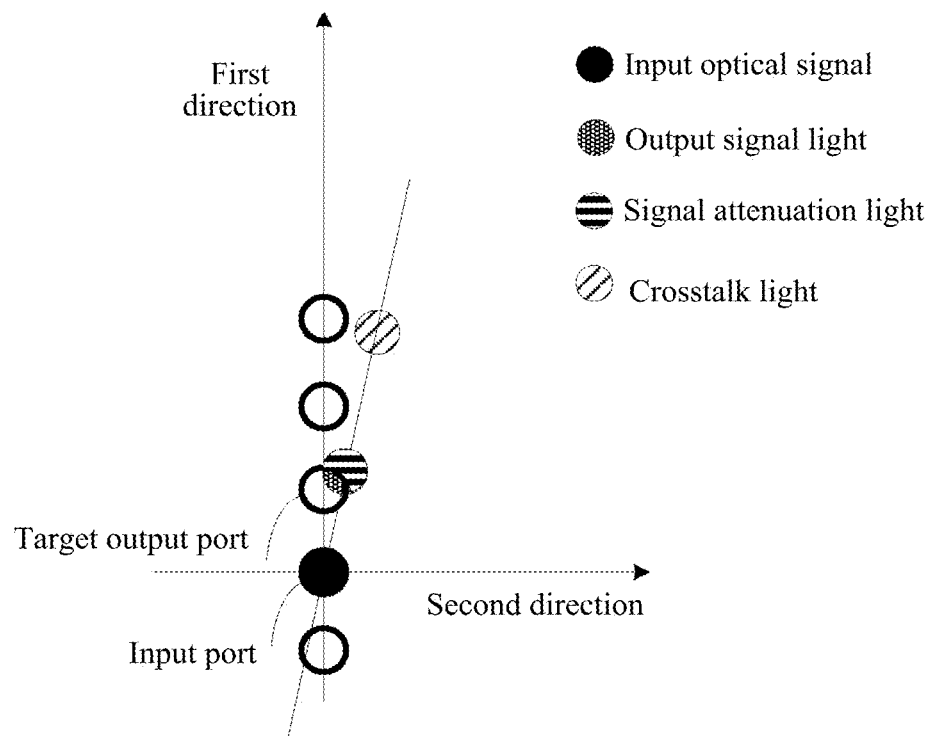
FIG. 8 is a side view of second optical path deflection corresponding to diffraction processing in the method shown in FIG. 5.

FIG. 5 is a flowchart of Embodiment 2 of a method for transmitting an optical signal according to the present application, and FIG. 6 is a schematic diagram of first optical path deflection corresponding to diffraction processing in the method shown in FIG. 5. FIG. 7 is a side view of the first optical path deflection corresponding to diffraction processing shown in FIG. 6. FIG. 8 is a side view of second optical path deflection corresponding to diffraction processing in the method shown in FIG. 5.

As shown in FIG. 5, based on the method shown in FIG. 2, in this embodiment, the diffraction processing in S101 may include the specific implementation of S501 for implementation.

S501:

Determining, based on a first direction, a first deflection angle of a diffraction direction of the signal light in the first direction and a second deflection angle of the crosstalk light in the first direction, where the first direction is a connection direction from the input port to the target output port; and deflecting, in a second direction, a diffraction direction of a part or all of the crosstalk light, so that the part or all of the crosstalk light is output to an area outside all the output ports, where the second direction intersects with an input direction of the input port.

In this embodiment, the second direction needs to neither coincide with nor be parallel to an input direction of the input port. To be specific, in this embodiment, diffractive light of the input optical signal is deflected in the first direction and in any second direction that does not coincide with the first direction.

Optionally, while the crosstalk light is deflected in the second direction, S501 further includes:

deflecting, in a second direction, the diffraction direction of the signal light, so that a part or all of the signal light is output to an area outside all target output ports, where the second direction intersects with the input direction of the input port.

As shown in FIG. 6 and FIG. 7, when the diffraction direction of the signal light is deflected in the second direction, signal attenuation light in the signal light is transmitted to an area outside the target output port. To be specific, the signal attenuation light split from the signal light may also complete a part of a target attenuation value.

When a target attenuation value is relatively large, the crosstalk light may be completely deflected out of all the target output ports, so that a crosstalk value corresponding to each output port decreases.

When the target attenuation value is relatively small, both the signal light and the crosstalk light are deflected in the second direction, and a second deflection angle of the crosstalk light in the first direction is greater than a first deflection angle of the signal light in the first direction. Therefore, when a diffraction direction in which the crosstalk light is superposed on the signal light is deflected in the second direction, a speed at which the crosstalk light moves away from the output port is greater than a speed at which the signal light moves away from the output port. In this way, crosstalk values corresponding to the output port during power balancing still decrease.

Preferably, as shown in FIG. 6, when the second direction is perpendicular to the first direction and the input direction of the input port, the speed at which the crosstalk light moves away from all the output ports is highest relative to the speed at which the signal light moves away from the output ports, and the crosstalk value corresponding to each output port decreases more significantly. Optionally, any other second direction having an angle with the first direction may alternatively be selected. For example, the angle with the first direction is an acute angle, provided that the speed at which the crosstalk light moves away from the output ports is greater than the speed at which the signal light moves away from the output ports. This is not limited in the present application.

It should be noted that only diffraction directions of the signal light and one channel of the crosstalk light are shown in the figure, and processing of other channels of the crosstalk light is the same as processing of the crosstalk light shown in the figure. Details are not described herein again. A manner in which the output ports and the input port are arranged in the figure is only an optional form. This embodiment of the present application may also be applied to another arrangement manner, provided that the crosstalk light has a sufficiently large deflection angle and is transmitted outside a farthest output port.

Optionally, a deflection angle of the signal light in the first direction and/or the second direction may be further used to enable a part of the signal light to be transmitted to the area outside the target output port. For example, referring to FIG. 8, the signal light may be deflected by an additional angle in the first direction.

A quantity of pixels of a spot of the input optical signal on the LCOS that are distributed in the first direction is usually greater than a quantity of pixels of the spot of the input optical signal on the LCOS that are distributed in the second direction, and the diffraction processing is to adjust a diffraction direction of diffractive light of the input optical signal based on pixels. Therefore, compared with that power attenuation is implemented by using the deflection angle of the diffraction direction of the signal light in the second direction, the first deflection angle of the signal light in the first direction is enabled to be slightly greater than or less than a reference deflection angle of the signal light in the first direction when the signal light does not need to be attenuated, that is, the deflection angle in the first direction and the deflection angle in the second direction are used in a combined manner, so that accuracy of power attenuation control may be increased while the crosstalk value corresponding to each output port is reduced.

Embodiment 3

Figure 11:
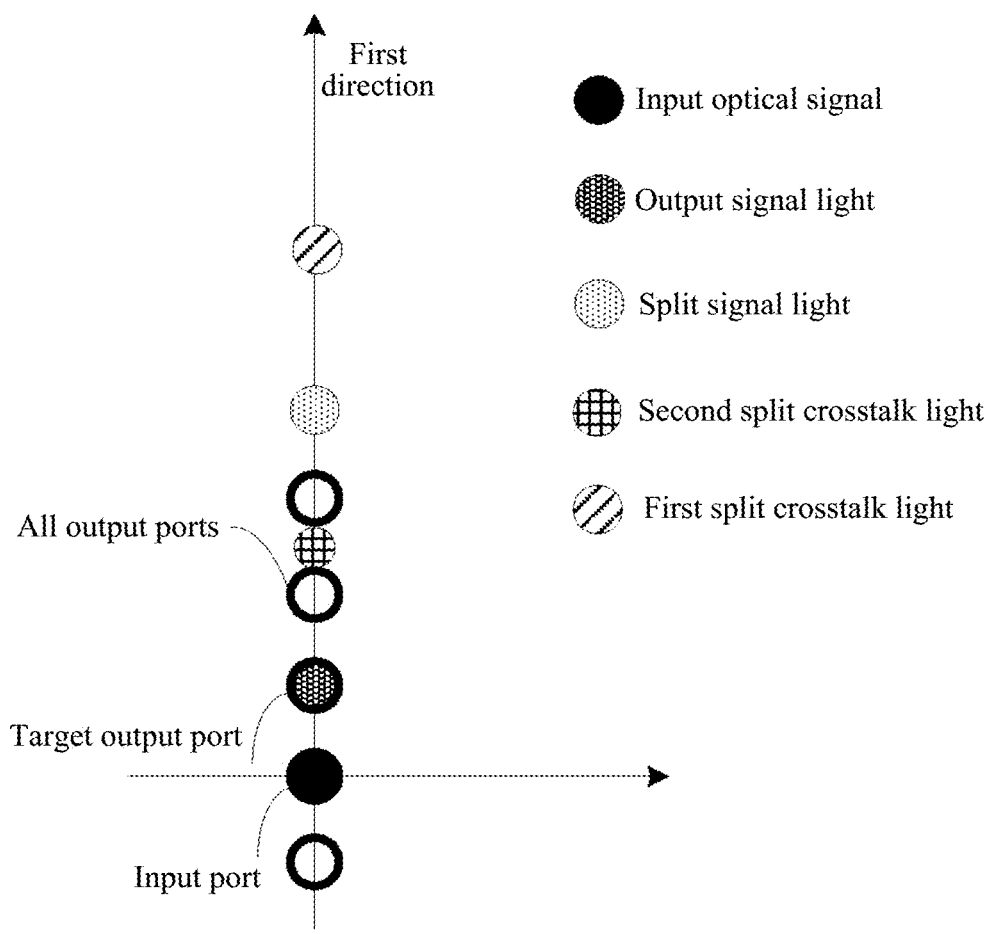
FIG. 11 is a side view of the first optical path deflection corresponding to diffraction processing shown in FIG. 10.
Figure 12:
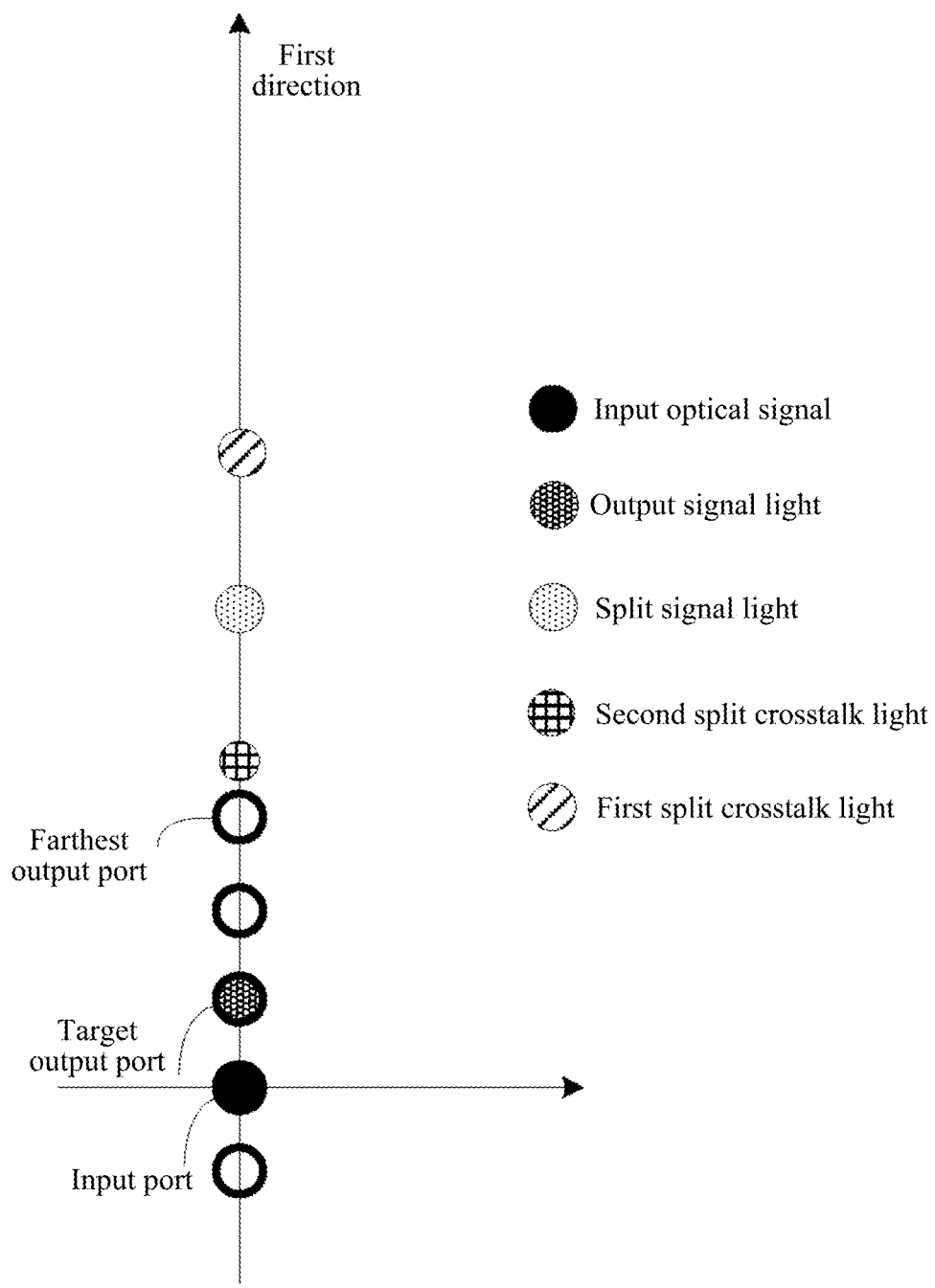
FIG. 12 is a side view of second optical path deflection corresponding to diffraction processing in the method shown in FIG. 9.

FIG. 9 is a flowchart of Embodiment 3 of a method for transmitting an optical signal according to the present application, and FIG. 10 is a schematic diagram of first optical path deflection corresponding to diffraction processing in the method shown in FIG. 9. FIG. 11 is a side view of the first optical path deflection corresponding to diffraction processing shown in FIG. 10. FIG. 12 is a side view of second optical path deflection corresponding to diffraction processing in the method shown in FIG. 9.

As shown in FIG. 9, based on the method shown in FIG. 2, in this embodiment, the diffraction processing in S101 may include the specific implementation of S901 for implementation.

S901:

Determining, based on a first direction, a first deflection angle of a diffraction direction of the signal light in the first direction and a second deflection angle of the crosstalk light in the first direction, where the first direction is a connection direction from the input port to the target output port; and the crosstalk light including first split crosstalk light and second split crosstalk light, deflecting, in a second direction, a diffraction direction of the first split crosstalk light by a third deflection angle; and deflecting, in the second direction, a diffraction direction of the second split crosstalk light by a fourth deflection angle or skip deflecting a diffraction direction of the second split crosstalk light.

In this embodiment, as shown in FIG. 10, the crosstalk light is divided into two parts, the first split crosstalk light and the second split crosstalk light. The diffraction directions of the first split crosstalk light and the second split crosstalk light are respectively deflected in the second direction by different angles, so that the first split crosstalk light in the crosstalk light can be directly transmitted outside all the output ports by controlling the deflection angle of the first split crosstalk light in the second direction, thereby reducing a crosstalk value corresponding to each output port during power balancing.

It should be noted that during the diffraction processing, light splitting is performed not only on the crosstalk light, but also on the signal light. The part of light split from the signal light may be referred to as split signal light, and S901 may further include:

deflecting, in the second direction, a diffraction direction of the split signal light by a third deflection angle, and deflecting, in the second direction, a diffraction direction of a part of the signal light, which is other than the split signal light, by a fourth deflection angle.

Optionally, the fourth deflection angle may be 0.

Preferably, a deflection angle of the diffraction direction of the split signal light in the second direction and/or the first direction can enable the split signal light to be output to an area outside all output ports, referring to FIG. 12, so that while light splitting is performed on the crosstalk light, the split signal light split from the signal light is prevented from bringing new crosstalk to each output port.

Optionally, the second direction may be the same as the first direction or different from the first direction. Optionally, an angle between the second direction and the first direction is an acute angle or a right angle.

As shown in FIG. 10 to FIG. 12, when the second direction is the same as the first direction, a deflection angle of the diffraction direction of the second split crosstalk light in the first direction includes the second deflection angle and the fourth deflection angle, and a deflection angle of the diffraction direction of the first split crosstalk light in the first direction includes the second deflection angle and the third deflection angle. Correspondingly, a deflection angle of the part of the signal light other than the split signal light in the first direction includes the first deflection angle and the fourth deflection angle, and a deflection angle of the split signal light in the first direction includes the first deflection angle and the third deflection angle.

That is, when the second direction may be the same as the first direction and the fourth deflection angle is 0, the diffraction direction of the part of the signal light other than the split signal light is deflected by the first deflection angle in the first direction, and the diffraction direction of the second split crosstalk light is deflected by the second deflection angle in the first direction.

In this embodiment, a target attenuation value of the input signal light may be jointly completed by using powers split from the first split crosstalk light, the second split crosstalk light, and the split signal light, so that power balancing of the input signal light is controlled more flexibly.

Optionally, the part of the signal light other than the split signal light may further include signal attenuation light. The deflection angle of the signal light in the first direction and/or the second direction may be further used to enable a part of the signal light to be transmitted to the area outside the target output port. A specific implementation thereof is similar to an implementation of the signal attenuation light in FIG. 8. Details are not described herein again.

Embodiment 4

Figure 15:
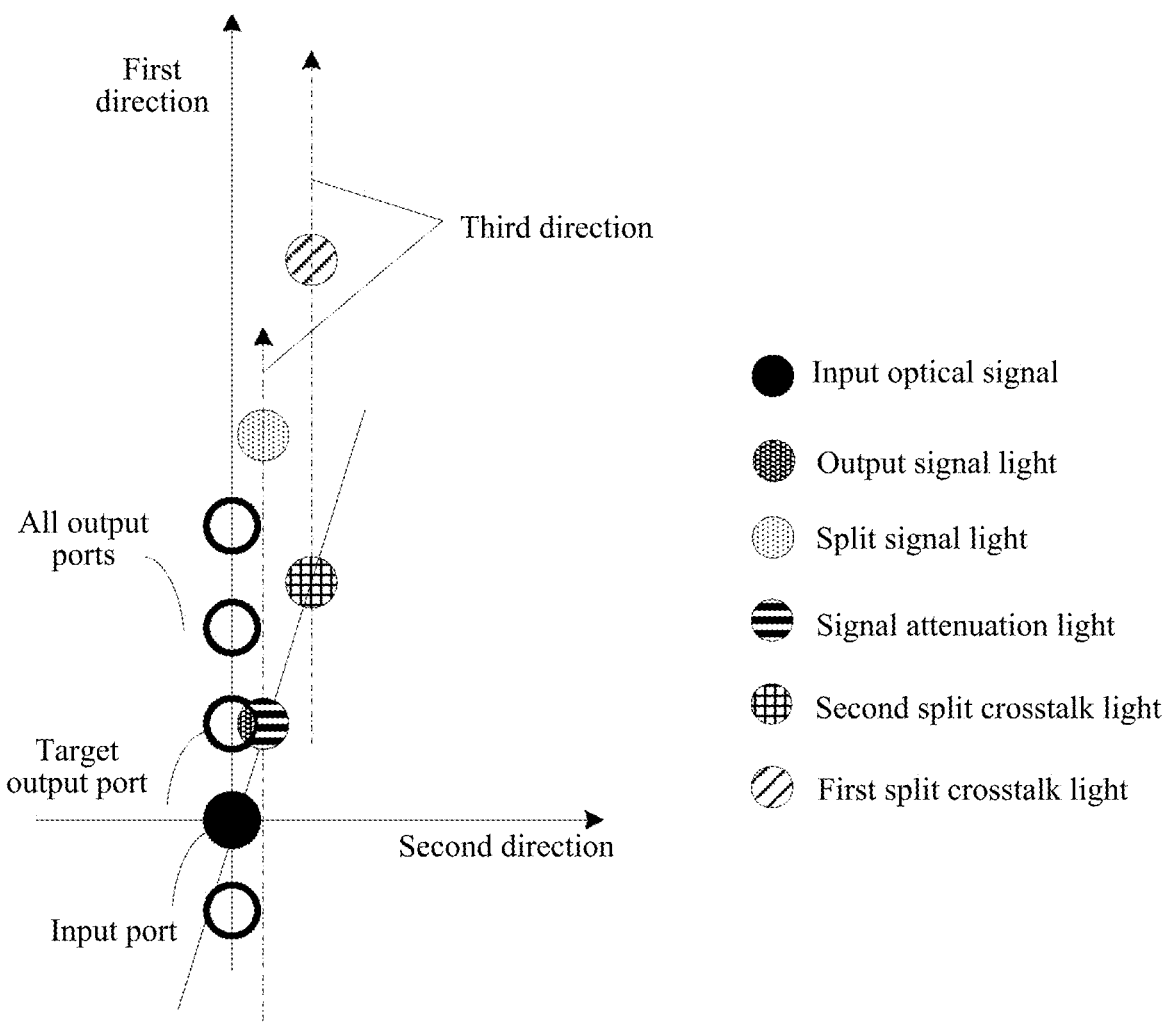
FIG. 15 is a side view of the first optical path deflection corresponding to diffraction processing shown in FIG. 13.
Figure 16:
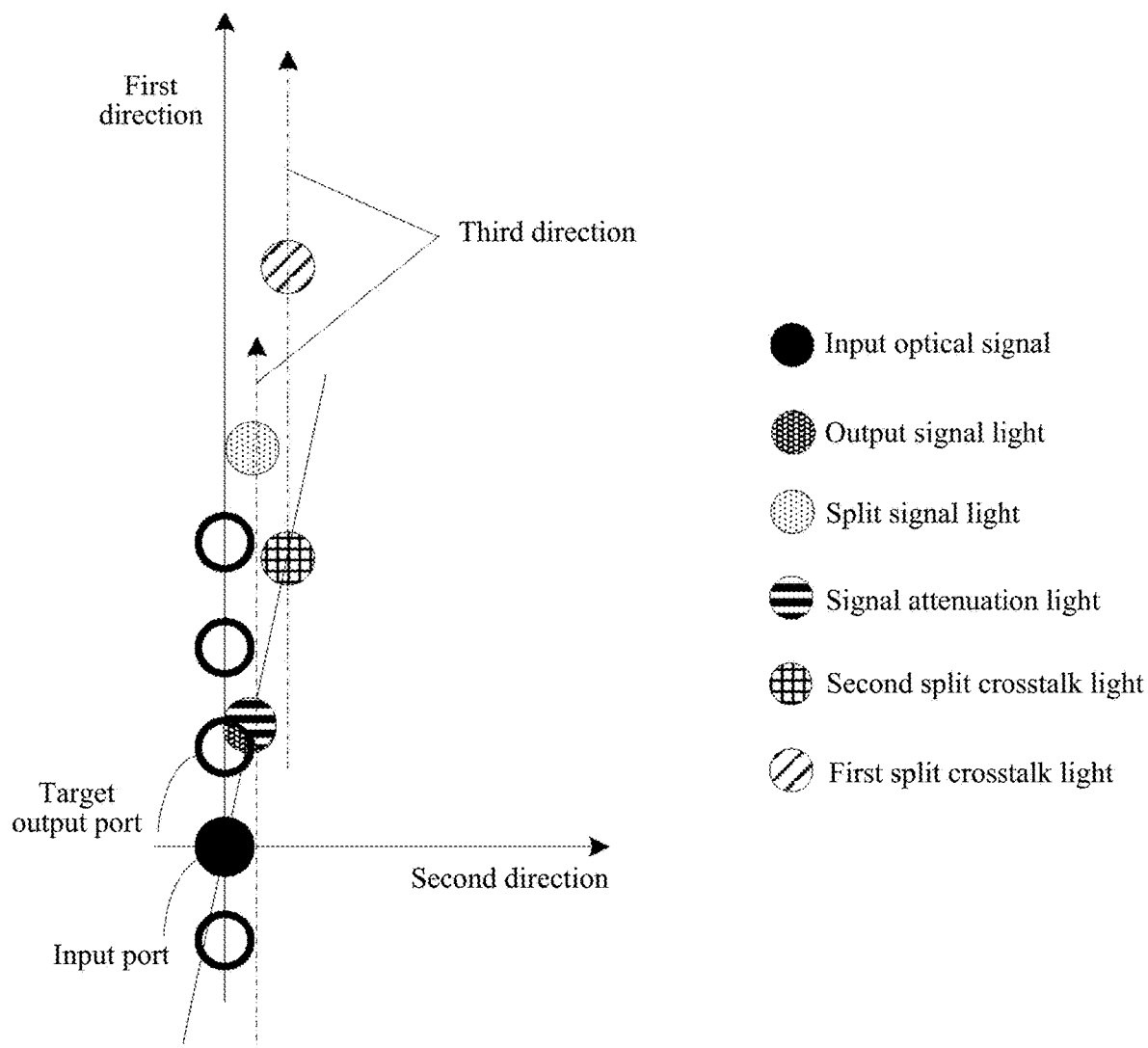
FIG. 16 is a side view of second optical path deflection corresponding to diffraction processing in the method shown in FIG. 13.

FIG. 13 is a flowchart of Embodiment 4 of a method for transmitting an optical signal according to the present application, and FIG. 14 is a schematic diagram of first optical path deflection corresponding to diffraction processing in the method shown in FIG. 13. FIG. 15 is a side view of the first optical path deflection corresponding to diffraction processing shown in FIG. 13. FIG. 16 is a side view of second optical path deflection corresponding to diffraction processing in the method shown in FIG. 13.

As shown in FIG. 13, based on the method shown in FIG. 9 to FIG. 12, in this embodiment, the diffraction processing in S101 may include the specific implementation of S1301 for implementation.

S1301:

Determining, based on a first direction, a first deflection angle of a diffraction direction of the signal light in the first direction and a second deflection angle of the crosstalk light in the first direction, where the first direction is a connection direction from the input port to the target output port;

the crosstalk light including first split crosstalk light and second split crosstalk light. Deflecting, in a second direction, a diffraction direction of the first split crosstalk light by a third deflection angle; and deflecting in the second direction, a diffraction direction of the second split crosstalk light by a fourth deflection angle or skip deflecting a diffraction direction of the second split crosstalk light; and deflecting, in the third direction, a diffraction direction of the crosstalk light.

The second direction is different from the third direction.

In this embodiment, an advantage of the implementation shown in FIG. 5 and an advantage of the implementation shown in FIG. 9 are combined. Implementations of the third direction in this embodiment are similar to the implementations of the second direction in the embodiment shown in FIG. 5 to FIG. 8. Details of a technical effect of the implementations are not described herein again.

Preferably, the second direction is the same as the first direction, and the third direction is perpendicular to the first direction, to achieve maximum crosstalk decrease amplitude and maximum control accuracy of power attenuation.

Embodiment 5

Based on the method shown in FIG. 13, this embodiment further provides a specific implementation.

In this embodiment, when the input direction of the input port and output directions of all the output ports are parallel to each other, the input direction of the input port is opposite to the output directions of all the output ports, the input port and all the output ports are located in a same plane, and the fourth deflection angle is zero, the transmission method may include:

performing the diffraction processing based on a first grating diffraction equation in the first direction, where the first grating diffraction equation is used to determine, based on a first period parameter, deflection angles of the signal light and the crosstalk light in the first direction, and the first period parameter is used to enable all of the signal light to be output from the target output port when a target attenuation value of the input optical signal is zero;

performing the diffraction processing based on a second grating diffraction equation in the third direction, where the second grating diffraction equation is used to determine, based on a second period parameter, deflection angles of the signal light and the crosstalk light in the third direction; and performing the diffraction processing based on a splitting grating equation in the second direction, where the splitting grating equation is used to determine the first split crosstalk light and the second split crosstalk light, based on a split ratio, the first period parameter, and the third period parameter, and the split ratio being a ratio of the first split crosstalk light to the second split crosstalk light, where when the target attenuation value is not zero, the split ratio and the third period parameter are used to enable a sum of powers of the crosstalk light and the split signal light to be equal to the target attenuation value.

For example, the first grating diffraction equation in the first direction may be $$\Lambda_1(\sin \theta + \sin B_m) = m\lambda,$$

where $\Lambda_1$ is the first period, $\theta$ is an incident angle of the optical signal, m is an order of diffractive light, $B_m$ is a diffraction angle, and $\lambda$ is a wavelength of the optical signal. For example, a diffraction angle corresponding to first-order diffractive light (m=1) of the input optical signal is $B_1$, a diffraction angle corresponding to second-order diffractive light (m=2) of the optical signal is $B_2$, and so on.

Similarly, the second grating diffraction equation in the third direction may be $$\Lambda_2(\sin \theta + \sin B_m) = m\lambda,$$

where $\Lambda_2$ is the second period.

A splitting grating equation in the second direction may be $$\varphi_{splitting}(y,\lambda) = \text{Arg}\{C_1(\lambda)I(y)e^{j\varphi_1(y)} + C_2(\lambda)I(y)e^{j\varphi_2(y)}\},$$

where y is a coordinate of a pixel in the second direction, I is distribution strength of the input optical signal, $C_1$ and $C_2$ are a first split ratio and a second split ratio, $C_1$ corresponds to the output signal light and the first split crosstalk light, $C_2$ corresponds to the split signal light and the second split crosstalk light, $C_1+C_2=1$, $\varphi_1(y)$ and $\varphi_2(y)$ are period functions (whose periods are respectively $\Lambda_1$ and $\Lambda_3$) having a linear change from 0 to 2pi. During even distribution, the distribution strength of the optical signal may be 1.

Optionally, based on the incident angle of the optical signal and the wavelength of the optical signal, the first grating diffraction equation may also determine a diffraction angle of each channel of diffractive light of the optical signal. To be specific, when two or more channels of optical signals having different wavelengths are input into the input port, optical path switching and power attenuation processing may be separately performed for the optical signals having the different wavelengths.

Optionally, the first period parameter may be set based on the target output port and the target attenuation value. For example, the first period parameter may be set to enable all of the signal light to be output from the target output port when the target attenuation value of the input optical signal is zero. That is, when the input optical signal does not need to be attenuated and optical path switching needs to be implemented only in the WSS, setting of the first period parameter needs to ensure that all of the signal light is output from the target output port.

Preferably, the split ratio and the second period parameter are used to enable a crosstalk value corresponding to the crosstalk light to be the minimize one.

Crosstalk specifications of the crosstalk light for other output ports when different split ratios and second periods are used may be obtained based on the target attenuation value and the first period parameter.

Preferably, when the first the split ratio $\in$ (0.8, 1) and/or the first the split ratio $\in$ (0, 0.2), the crosstalk specification is better. Preferably, the second period parameter $\in$ (the target period, 255). The target period is a minimum value of the second period when a sum of powers of the first attenuation component and the second attenuation component is equal to the target attenuation value. It should be noted that when the selected second period is smaller, a deflection angle after the diffraction processing is larger, and a distance from the first split crosstalk light to the output port is larger, so that the crosstalk value further decreases.

Preferably, the split ratio and the second period parameter are used to enable crosstalk values corresponding to all the output ports to be minimized.

Optionally, the second split crosstalk light may include two or more channels of light, and a second split ratio may be $C_2$, $C_3$, or the like.

The splitting grating equation in Embodiment 7 may be:

$$\varphi_{splitting}(y,\lambda) = \text{Arg}\{C_1(\lambda)I(y)e^{j\varphi_1(y)} + C_2(\lambda)I(y)e^{j\varphi_2(y)} + C_3(\lambda)I(y)e^{j\varphi_3(y)}\},$$

where $\varphi_3(y)$ is a period function (whose period is $\Lambda_3$) having a linear change from 0 to 2pi.

For example, when a distance from the target output port to the input port is d, a distance from a farthest output port to the input port is 6d, and the target attenuation value is 12 dBm, an emergent angle at which each channel of diffractive light leaves the LCOS may be determined based on a location relationship between the target output port and the farthest output port. Based on calculation, the first period may be 24, and the third period may be 4. In this case, the first split crosstalk light and the split signal light are exactly deflected to outside the farthest output port. Then the crosstalk values corresponding to the output ports under various combinations of the second period and the first split ratio are scanned. Through actual test, an obtained optimal combination is that the first split ratio is 0.85 and the second period is 68. A phase image of a combined phase grating may be obtained based on the parameter combination.

Figure 17:
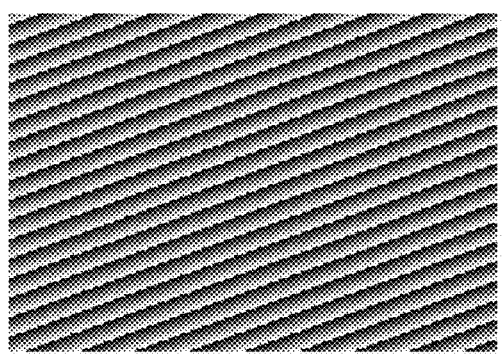
FIG. 17 is a phase image of a combined phase grating loaded to LCOS when an attenuation value is 12 dB.
Figure 18:
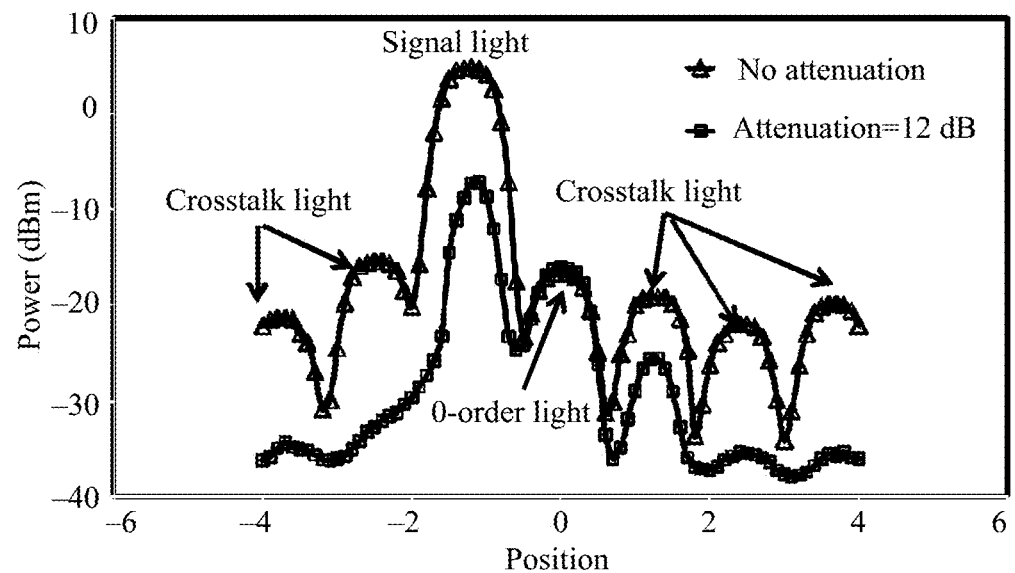
FIG. 18 is a schematic diagram of comparison between a power of crosstalk light when an attenuation value is 12 dB and a power of crosstalk light without attenuation.

FIG. 17 is a phase image of a combined phase grating loaded to the LCOS when an attenuation value is 12 dB, and FIG. 18 is a schematic diagram of comparison between a power of crosstalk light when an attenuation value is 12 dB and a power of crosstalk light without attenuation. As shown in the figures, based on actual measurement, the power of each channel of crosstalk light after power balancing is performed based on the technical solutions in the embodiments of the present application significantly decreases.

Figure 19:
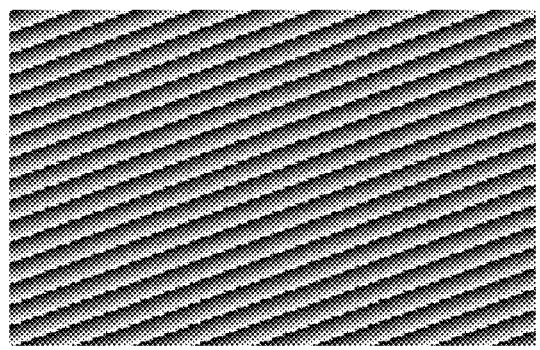
FIG. 19 is a phase image of a combined phase grating loaded to LCOS when an attenuation value is 12.1 dB.
Figure 20:
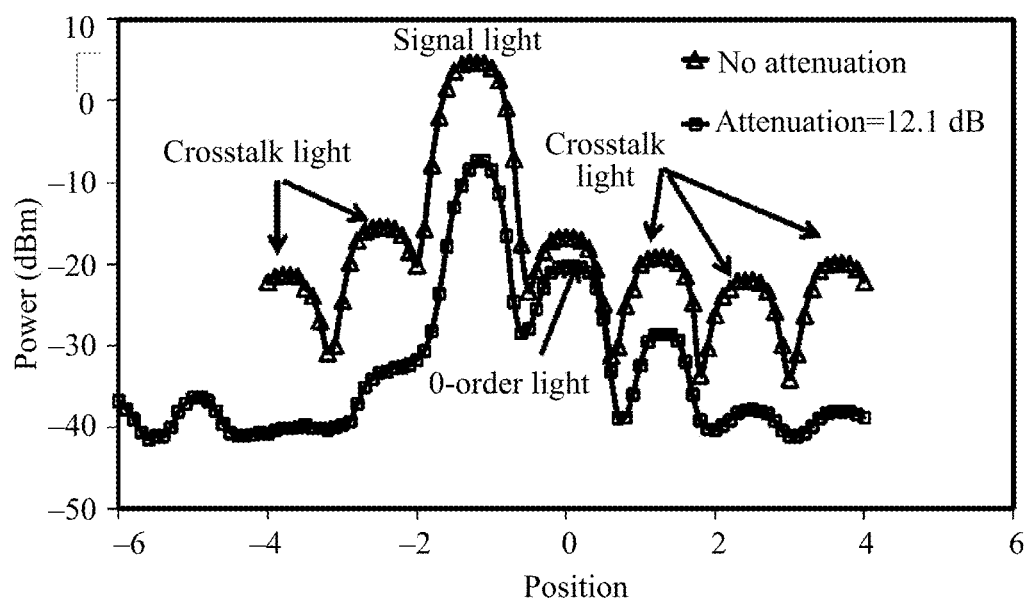
FIG. 20 is a schematic diagram of comparison between a power of crosstalk light when an attenuation value is 12.1 dB and a power of crosstalk light without attenuation.

Similarly, when the target attenuation value is 12.1 dBm, an optimal parameter combination obtained based on a similar scanning method is that the first split ratio is 0.88 and the second period is 67, and a phase image of a combined phase grating may be obtained based on the parameter combination. FIG. 19 is a phase image of a combined phase grating loaded to the LCOS when an attenuation value is 12.1 dB, and FIG. 20 is a schematic diagram of comparison between a power of crosstalk light when an attenuation value is 12.1 dB and a power of crosstalk light without attenuation. As shown in the figures, based on actual measurement, the power of the crosstalk light after power balancing is performed based on the technical solutions in the embodiments of the present application significantly decreases.

Embodiment 6

This embodiment of the present application further provides an apparatus for transmitting an optical signal, configured to perform the method for transmitting an optical signal shown in any one of FIG. 2 to FIG. 13.

Optionally, the apparatus may include a receiving module, a sending module, and a diffraction processing module.

The receiving module may be configured to receive an input optical signal.

The diffraction processing module may be configured to perform the method for transmitting an optical signal shown in any one of FIG. 2 to FIG. 13.

The sending module may be configured to emit, from LCOS, each channel of diffractive light obtained through diffraction processing.

Optionally, the apparatus for transmitting an optical signal of the present application may be disposed on the LCOS or on a side of the LCOS, to instruct the LCOS to perform the method for transmitting an optical signal shown in any one of FIG. 2 to FIG. 13.

Details and technical effects of other technical solutions in this embodiment of the present application are similar to those of the method shown in FIG. 2 to FIG. 13. Details are not described herein again.

Embodiment 7

This embodiment of the present application further provides a wavelength selective switch WSS, including: an input port, a plurality of output ports, and liquid crystal on silicon. The liquid crystal on silicon is configured to perform the method for transmitting an optical signal according to any one of FIG. 2 to FIG. 13.

Optionally, the WSS may further include a lens. The input port and the output ports are located on one side of the lens, and the liquid crystal on silicon is located on the other side of the lens.

Details and technical effects of other technical solutions in this embodiment are similar to those of the method shown in FIG. 2 to FIG. 13. Details are not described herein again.

An embodiment of the present application further provides a ROADM node, including devices such as the wavelength selective switch according to the foregoing embodiment and an amplifier.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method for transmitting an optical signal, the method comprising:
    performing diffraction processing on an input optical signal obtained from an input port, to obtain signal light and crosstalk light, wherein the signal light is output to a target output port in a plurality of output ports; and
    wherein performing diffraction processing comprises:
    determining, based on a first direction, a first deflection angle in the first direction between a diffraction direction of the signal light and a input direction of the input port, and a second deflection angle in the first direction between a diffraction direction of the crosstalk light and the input direction of the input port, wherein the first direction is a connection direction from the input port to the target output port; and
    deflecting, in a second direction, a part or all of the crosstalk light to propagate in a diffraction direction to output the part or all of the crosstalk light to an area outside the plurality of output ports, and wherein the second direction intersects with the input direction of the input port.

2. The transmission method according to claim 1, wherein the first deflection angle of the signal light in the first direction and/or a deflection angle of the signal light in the second direction is further used to enable a part of the signal light to be transmitted to an area outside the target output port.

3. The transmission method according to claim 1, wherein:
    the crosstalk light comprises first split crosstalk light and second split crosstalk light; and
    deflecting, in a second direction, a part or all of the crosstalk light to propagate in a diffraction direction comprises:
    deflecting, in the second direction, the first split crosstalk light to propagate in a diffraction direction which forms a third deflection angle with respect to the input direction of the input port, and
    deflecting, in the second direction, the second split crosstalk light to propagate in a diffraction direction which forms a fourth deflection angle with respect to the input direction of the input port or skipping deflecting the second split crosstalk light.

4. The transmission method according to claim 1, wherein:
    the second direction is the same as the first direction; and
    performing diffraction processing further comprises:
    deflecting, in a third direction, the crosstalk light to propagate in a diffraction direction, wherein the third direction is perpendicular to the first direction.

5. The transmission method according to claim 1, wherein:
    the signal light comprises split signal light; and
    performing diffraction processing further comprises:
    deflecting, in the second direction, the split signal light to propagate in a diffraction direction which forms a third deflection angle with respect to the input direction of the input port,
    deflecting, in the second direction, a part of the signal light other than the split signal light to propagate in a diffraction direction which forms a fourth deflection angle with respect to the input direction of the input port, and
    wherein the part of the signal light other than the split signal light comprises signal attenuation light, and the first deflection angle of the signal light in the first direction and/or the third deflection angle of the split signal light in the second direction is further used to enable a part of the signal light to be transmitted to an area outside the target output port.

6. The transmission method according to claim 3, wherein the second direction is the same as the first direction, a deflection angle of the diffraction direction of the second split crosstalk light in the first direction with respect to the input direction of the input port is a sum of the second deflection angle and the fourth deflection angle, and a deflection angle of the diffraction direction of the first split crosstalk light in the first direction with respect to the input direction of input port is the a sum of the second deflection angle and the third deflection angle.

7. The transmission method according to claim 6, wherein:
the input direction of the input port and output directions of all the output ports are parallel to each other, the input direction of the input port is opposite to the output directions of all the output ports, and the input port and all the output ports are located in a same plane, and the fourth deflection angle is zero; and
the transmission method comprises:
performing the diffraction processing based on a first grating diffraction equation, wherein the first grating diffraction equation is used to determine, based on a first period parameter, deflection angles of the signal light and the crosstalk light in the first direction with respect to the input direction of the input port, and the first period parameter is used to enable all of the signal light to be output from the target output port when a target attenuation value of the input optical signal is zero,
performing the diffraction processing based on a second grating diffraction equation, wherein the second grating diffraction equation is used to determine, based on a second period parameter, deflection angles of the signal light and the crosstalk light in the third direction with respect to the input direction of the input port, and
performing the diffraction processing based on a splitting grating equation, wherein the splitting grating equation is used to determine the first split crosstalk light and the second split crosstalk light based on a split ratio, the first period parameter, and the second period parameter, and the split ratio being a ratio of the first split crosstalk light to the second split crosstalk light.

8. The transmission method according to claim 7, wherein the split ratio and the second period parameter are used to enable a sum of powers of the crosstalk light and the split signal light to be equal to the target attenuation value, and when the target attenuation value is not zero, the split ratio and the second period parameter are used to enable crosstalk values corresponding to all the output ports to be minimized.

9. A wavelength selective switch, comprising:
an input port;
a plurality of output ports; and
liquid crystal on silicon configured to:
perform diffraction processing on an input optical signal obtained from the input port, to obtain signal light and crosstalk light, wherein the signal light is output to a target output port in the plurality of output ports; and
wherein to perform diffraction processing, the liquid crystal on silicon is configured to:
determine, based on a first direction, a first deflection angle in the first direction between a diffraction direction of the signal light and the input direction of the input port, and a second deflection angle in the first direction between a diffraction direction of the crosstalk light and the input direction of the input port, wherein the first direction is a connection direction from the input port to the target output port; and
deflect, in a second direction, a part or all of the crosstalk light to propagate in a diffraction direction to output the part or all of the crosstalk light to an area outside the plurality of output ports, and wherein the second direction intersects with an input direction of the input port.

10. The wavelength selective switch according to claim 9, further comprising:
a lens; and
wherein the input port and the plurality of output ports are located on a first side of the lens, and the liquid crystal on silicon is located on a second side of the lens.

* * * * *